United States Patent
Mori (10) Patent No.: US 10,037,176 B2
(45) Date of Patent: Jul. 31, 2018

(54) PRINTER-END PAGE SEQUENCING OF DOCUMENT PAGES MULTIPAGE-CAPTURED BY PORTAL TERMINAL

(71) Applicant: Kyocera Document Solutions Inc., Osaka (JP)

(72) Inventor: Masato Mori, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 15/497,214

(22) Filed: Apr. 26, 2017

(65) Prior Publication Data

US 2017/0308333 A1  Oct. 26, 2017

(30) Foreign Application Priority Data

Apr. 26, 2016  (JP) ................ 2016-087839

(51) Int. Cl.
| | | |
|---|---|---|
| *H04N 1/195* | (2006.01) | |
| *H04N 1/00* | (2006.01) | |
| *G06F 3/12* | (2006.01) | |
| *G03G 21/14* | (2006.01) | |

(52) U.S. Cl.
CPC ............ *G06F 3/121* (2013.01); *G03G 21/14* (2013.01); *G06F 3/1206* (2013.01); *G06F 3/1211* (2013.01); *G06F 3/1244* (2013.01); *G06F 3/1292* (2013.01); *G06F 3/1293* (2013.01); *H04N 1/00307* (2013.01); *H04N 1/00689* (2013.01); *H04N 1/00708* (2013.01); *H04N 1/19594* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0129638 | A1* | 5/2009 | Kim .................. | G06K 9/00295 382/118 |
| 2015/0138609 | A1 | 5/2015 | Golding et al. | |
| 2016/0042257 | A1* | 2/2016 | Kim .................... | G06K 15/181 358/1.15 |

FOREIGN PATENT DOCUMENTS

| | | | |
|---|---|---|---|
| JP | 2003234996 A | * | 8/2003 |
| JP | 2006-013792 A | | 1/2006 |

OTHER PUBLICATIONS

JP_2003234996_A_T MachineTranslation, Japan, 2003, Kondo.*
JP_2006013792_A_T MachineTranslation, Japan, 2006, Furukawa.*

* cited by examiner

*Primary Examiner* — Victor Verbitsky
(74) *Attorney, Agent, or Firm* — James Judge (57) ABSTRACT

An image processing system includes a portable terminal and an image processing apparatus. The portable terminal includes a transmission processing unit that transmits each of the image data in units of the page of the document. The image processing apparatus includes a reception processing unit, a determination processing unit, and an output processing unit. The reception processing unit receives each of the image data in units of the page of the document transmitted from the portable terminal. The determination processing unit determines a page sequence of each of the image data in units of the page of the document based on each of the image data in units of the page of the document received by the reception processing unit. The output processing unit outputs each of the image data in units of the page of the document received by the reception processing unit in accordance with the page sequence.

6 Claims, 5 Drawing Sheets

PRINTER-END PAGE SEQUENCING OF DOCUMENT PAGES MULTIPAGE-CAPTURED BY PORTAL TERMINAL

INCORPORATION BY REFERENCE

This application is based upon, and claims the benefit of priority from, corresponding Japanese Patent Application No. 2016-087839 filed in the Japan Patent Office on Apr. 26, 2016, the entire contents of which are incorporated herein by reference.

BACKGROUND

Unless otherwise indicated herein, the description in this section is not prior art to the claims in this application and is not admitted to be prior art by inclusion in this section.

Generally, there is known an image processing system including a portable terminal, such as a smart phone including an imaging unit like a camera, and an image processing apparatus, such as a printer. In this typical image processing system, the imaging unit of the portable terminal obtains image data of a document, and the obtained image data of the document is transmitted to the image processing apparatus. In the image processing apparatus, the image data of the document transmitted from the portable terminal is printed and output.

SUMMARY

An image processing system according to one aspect of the disclosure includes a portable terminal and an image processing apparatus. The portable terminal includes an imaging unit, a data obtaining unit, a transmission processing unit, a reception processing unit, a determination processing unit, and an output processing unit. The data obtaining unit obtains image data of each page of a document having a plurality of pages using the imaging unit. The transmission processing unit transmits each of the image data in units of the page of the document obtained by the data obtaining unit. The image processing apparatus includes a reception processing unit, a determination processing unit, and an output processing unit. The reception processing unit receives each of the image data in units of the page of the document transmitted from the portable terminal. The determination processing unit determines a page sequence of each of the image data in units of the page of the document based on each of the image data in units of the page of the document received by the reception processing unit. The output processing unit outputs each of the image data in units of the page of the document received by the reception processing unit in accordance with the page sequence determined by the determination processing unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the attached drawings. The following embodiment is merely exemplary embodiment according to the disclosure and do not intend to limit the technical scope of the disclosure.

Image Processing System 100

Figure 1:
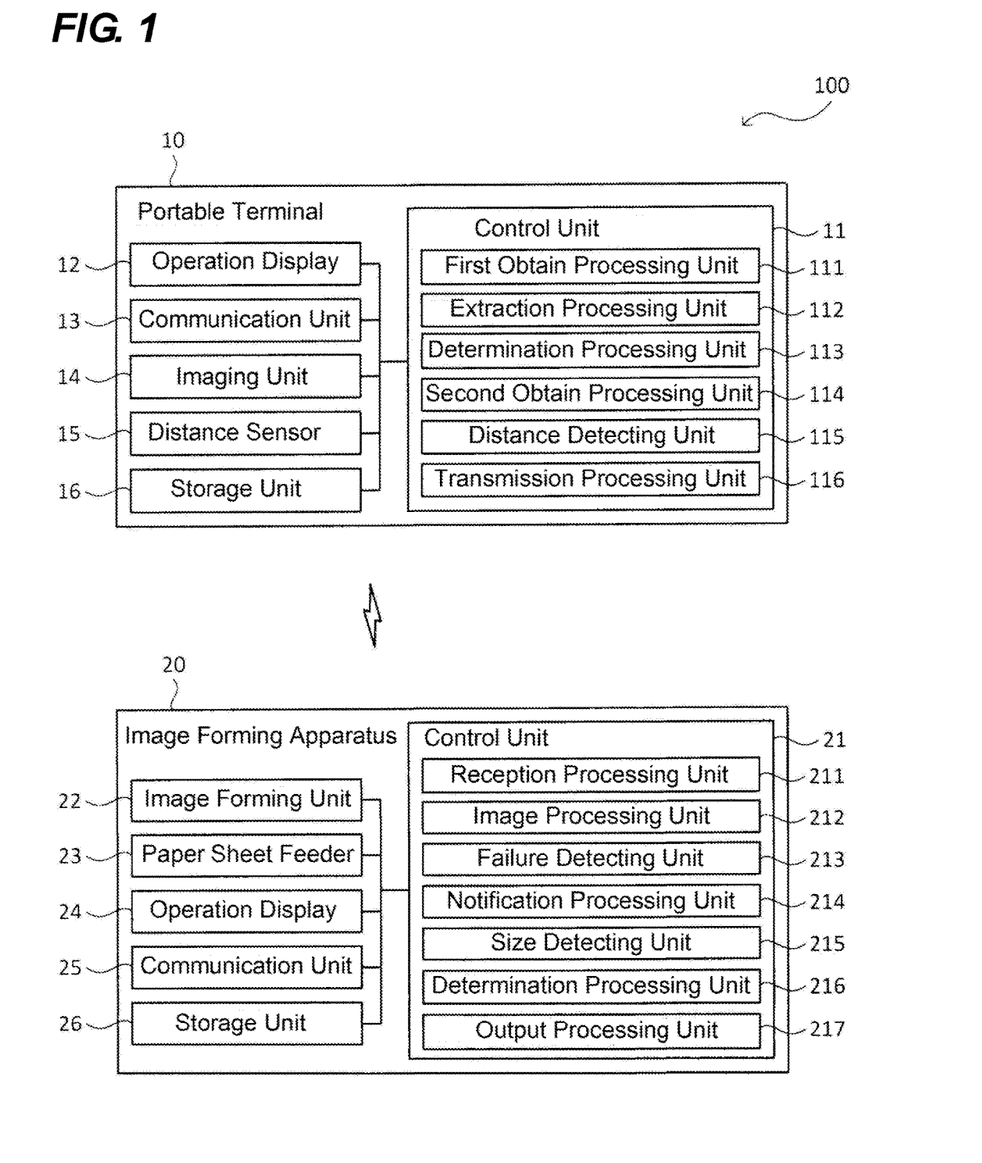
FIG. 1 illustrates a configuration of an image processing system according to one embodiment of the disclosure.

An image processing system 100 according to an embodiment of the disclosure includes, as illustrated in FIG. 1, a portable terminal 10 and an image forming apparatus 20. In the image processing system 100, a wireless data communication is executed between the portable terminal 10 and the image forming apparatus 20.

Portable Terminal 10

The portable terminal 10 is a mobile communication terminal, such as a smart phone that is carried by, for example, a user of the image forming apparatus 20. Specifically, the portable terminal 10 includes, as illustrated in FIG. 1, a control unit 11, an operation display 12, a communication unit 13, an imaging unit 14, a distance sensor 15, and a storage unit 16. The portable terminal 10 may be a mobile phone, a tablet terminal, a laptop personal computer, a PDA, or similar device.

The control unit 11 includes control equipment (not illustrated), such as a CPU, a ROM, a RAM, and an EEPROM. The CPU is a processor that executes various kinds of arithmetic processing. The ROM is a non-volatile storage medium that preliminarily stores information, such as a control program to cause the CPU to execute the various kinds of processing. The RAM is a volatile storage medium, and the EEPROM is a non-volatile storage medium. The RAM and the EEPROM are used as temporary memories (work areas) for the various kinds of processing that the CPU executes. In the control unit 11, the CPU executes the various kinds of control programs preliminarily stored in the ROM. This causes the control unit 11 to integrally control the portable terminal 10. The control unit 11 may be configured by an electronic circuit, such as an integrated circuit (ASIC), or may be a control unit separately disposed from a main control unit that integrally controls the portable terminal 10.

The operation display 12 includes a display, such as a liquid crystal display, that displays various kinds of information corresponding to a control command from the control unit 11 and an operation unit, such as a touch panel, that inputs various kinds of information to the control unit 11 corresponding to an operation of the user.

The communication unit 13 is a communication interface that is configured to execute the wireless data communication with an external communication device, such as the image forming apparatus 20. For example, the communication unit 13 is configured to execute a wireless communication according to a communication standard of a wireless LAN, such as Wi-Fi Direct®, with the communication device. The communication unit 13 may execute the wireless communication according to the communication standard of Bluetooth® with the communication device.

The imaging unit 14 is a camera that is configured to capture a photographic subject. Specifically, the imaging unit 14 is configured to output an electrical signal (image data) based on a light received from an outside.

The distance sensor 15 detects a distance between the imaging unit 14 and the photographic subject. For example, the distance sensor 15 is an infrared sensor including a light-emitting portion and a light receiving portion. For example, the distance sensor 15 detects the distance between the imaging unit 14 and the photographic subject based on a received light amount at the light receiving portion of the infrared light that is emitted from the light-emitting portion and reflected by the photographic subject. The distance sensor 15 may be a sensor using a light other than the infrared light. The distance sensor 15 may be a sensor using a sound wave.

The storage unit 16 is a non-volatile storage medium, such as a flash memory. In the storage unit 16, data reading and writing are performed by the control unit 11.

Image Forming Apparatus 20

Figure 2:
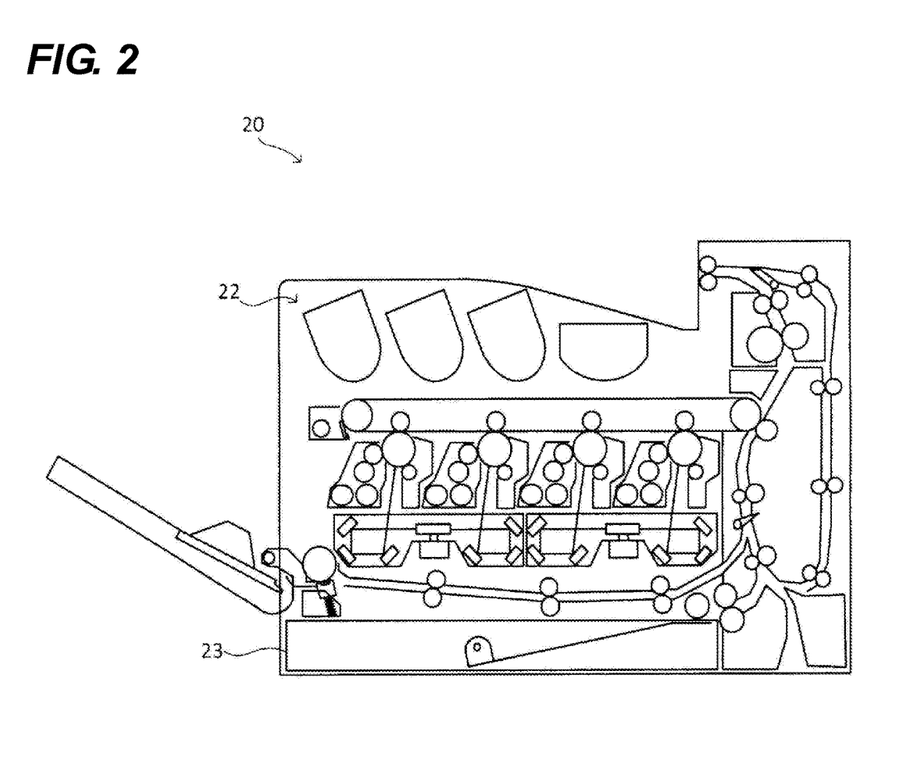
FIG. 2 illustrates a configuration of an image forming apparatus of the image processing system according to the one embodiment.

The image forming apparatus 20 is a printer that is configured to form an image based on the image data. Specifically, the image forming apparatus 20 includes, as illustrated in FIGS. 1 and 2, a control unit 21, an image forming unit 22, a paper sheet feeder 23, an operation display 24, a communication unit 25, and a storage unit 26. The image forming apparatus 20 may be a facsimile device, a copying machine, a multi-functional peripheral, or similar device. Here, the image forming apparatus 20 is an example of an image processing apparatus in the disclosure.

The control unit 21 includes the control equipment (not illustrated), such as the CPU, the ROM, the RAM, and the EEPROM. The CPU is the processor that executes the various kinds of arithmetic processing. The ROM is the non-volatile storage medium that preliminarily stores the information, such as the control program to cause the CPU to execute the various kinds of processing. The RAM is the volatile storage medium, and the EEPROM is the non-volatile storage medium. The RAM and the EEPROM are used as the temporary memories (work areas) for the various kinds of processing that the CPU executes. In the control unit 21, the CPU executes the various kinds of control programs preliminarily stored in the ROM. This causes the control unit 21 to integrally control the image forming apparatus 20. The control unit 21 may be configured by the electronic circuit, such as the integrated circuit (ASIC), or may be the control unit separately disposed from the main control unit that integrally controls the image forming apparatus 20.

The image forming unit 22 is configured to execute an image formation process (printing process) that forms a colored or a monochrome image by an electrophotographic method based on the image data input from an information processing device, such as an external personal computer. Specifically, the image forming unit 22 includes, as illustrated in FIG. 2, a plurality of image forming units that correspond to cyan (C), magenta (M), yellow (Y), and black (K), a light scanning unit (LSU), an intermediate transfer belt, a secondary transfer roller, a fixing unit, and a sheet discharge tray. In the image forming unit 22, the colored or the monochrome image is formed on a sheet that is supplied from the paper sheet feeder 23 and the sheet after the image formation is discharged to the sheet discharge tray.

The operation display 24 includes a display, such as the liquid crystal display, that displays various kinds of information corresponding to a control command from the control unit 21 and an operation unit, such as the touch panel, that inputs various kinds of information to the control unit 21 corresponding to an operation of the user.

The communication unit 25 is the communication interface that is configured to execute the wireless data communication with an external communication device, such as the portable terminal 10. For example, the communication unit 25 is configured to execute the wireless communication according to the communication standard of the wireless LAN, such as Wi-Fi Direct®, with the communication device. The communication unit 25 may execute the wireless communication according to the communication standard of Bluetooth® with the communication device.

The storage unit 26 is a storage medium, such as a solid state drive (SSD) or a hard disk drive (HDD). In the storage unit 26, data reading and writing are performed by the control unit 21.

In the image processing system 100, there is a case where the imaging unit 14 of the portable terminal 10 obtains image data of each page of a document having a plurality of pages and each of the obtained image data in units of the page of the document is sequentially transmitted to the image forming apparatus 20. In this case, the image forming apparatus 20 in a typical image processing system outputs each of the received image data by the page in accordance with a sequence of reception. Therefore, even in the typical image processing system, it is possible to output each of the image data in units of the page of the document in accordance with a page sequence using the image forming apparatus 20 when each of the image data in units of the page of the document is transmitted from the portable terminal 10 in accordance with the page sequence. However, in the typical image processing system, it is impossible to output each of the image data in units of the page of the document in accordance with the page sequence using the image forming apparatus 20 when each of the image data in units of the page of the document is transmitted from the portable terminal 10 not in accordance with the page sequence.

In contrast to this, the image processing system 100 according to the embodiment of the disclosure is configured to output each of the image data in units of the page of the document obtained by the portable terminal 10 in accordance with the page sequence, as described below.

Specifically, the storage unit 16 of the portable terminal 10 preliminarily stores a data obtaining program to cause the CPU of the control unit 11 to execute a first obtaining process (see FIG. 3) and a second obtaining process (see FIG. 4), which will be described later. For example, the data obtaining program is obtained from an external information processing device connected via a communications network (not illustrated), such as the Internet, and is installed into the storage unit 16.

The control unit 11 includes, as illustrated in FIG. 1, a first obtain processing unit 111, an extraction processing unit 112, a determination processing unit 113, a second obtain processing unit 114, a distance detecting unit 115, and a transmission processing unit 116. Specifically, the control unit 11 executes the data obtaining program stored in the storage unit 16 using the CPU. This causes the control unit 11 to function as the first obtain processing unit 111, the extraction processing unit 112, the determination processing unit 113, the second obtain processing unit 114, the distance detecting unit 115, and the transmission processing unit 116.

The first obtain processing unit 111 obtains image data of a photographic subject using the imaging unit 14 every time a preliminarily determined obtaining operation is performed. For example, the obtaining operation is an operation preliminarily determined for the operation display 12.

For example, the first obtain processing unit 111 causes the imaging unit 14 to output the image data of the photographic subject and the operation display 12 to display the image data of the photographic subject output from the imaging unit 14. Then, the first obtain processing unit 111 obtains the image data (still image data) of the photographic subject displayed on the operation display 12 at a time when the obtaining operation is performed every time the obtaining operation is performed.

The extraction processing unit 112 extracts image data in units of a page of the document from the image data of the photographic subject obtained by the first obtain processing unit 111.

For example, the extraction processing unit 112 executes a contour detection process that detects a contour of the image with respect to the image data of the photographic subject obtained by the first obtain processing unit 111. Next, the extraction processing unit 112 detects a rectangular shaped region included in the image data of the photographic subject based on an execution result of the contour detection process. Then, the extraction processing unit 112 extracts each of the detected rectangular shaped regions as the image data in units of the page of the document. Here, the combination of the first obtain processing unit 111 and the extraction processing unit 112 is one example of a data obtaining unit in the disclosure. The data obtaining unit in the disclosure may only be the first obtain processing unit 111.

The determination processing unit 113 determines whether the photographic subject includes an image in units of the page of the document or not.

For example, the determination processing unit 113 causes the imaging unit 14 to output the image data of the photographic subject and the operation display 12 to display the image data of the photographic subject output from the imaging unit 14. The determination processing unit 113 executes the contour detection process with respect to the image data of the photographic subject output from the imaging unit 14. Then, the determination processing unit 113 determines that the photographic subject includes the image in units of the page of the document when it is determined that the image data of the photographic subject includes one rectangular shaped region based on the execution result of the contour detection process.

The second obtain processing unit 114 obtains the image data of the photographic subject using the imaging unit 14 every time the determination processing unit 113 determines that the photographic subject includes the image in units of the page of the document.

For example, the second obtain processing unit 114 obtains the image data (still image data) of the photographic subject displayed on the operation display 12 at a time when the determination is made by the determination processing unit 113 every time the determination processing unit 113 determines that the photographic subject includes the image in units of the page of the document. Here, the combination of the determination processing unit 113 and the second obtain processing unit 114 is another example of a data obtaining unit in the disclosure.

The distance detecting unit 115 detects a distance from the photographic subject when the first obtain processing unit 111 and the extraction processing unit 112 obtain the image data of each page of the document. The distance detecting unit 115 detects a distance from the photographic subject when the determination processing unit 113 and the second obtain processing unit 114 obtain the image data of each page of the document.

Specifically, the distance detecting unit 115 detects the distance from the photographic subject when the first obtain processing unit 111 obtains the image data of the photographic subject using the distance sensor 15. The distance detecting unit 115 detects the distance from the photographic subject when the second obtain processing unit 114 obtains the image data of the photographic subject using the distance sensor 15. For example, the distance detecting unit 115 detects the distance from the photographic subject when the first obtain processing unit 111 or the second obtain processing unit 114 obtains the image data of the photographic subject for the first time. The distance detecting unit 115 may detect the distance from the photographic subject every time the first obtain processing unit 111 or the second obtain processing unit 114 obtains the image data of the photographic subject.

The transmission processing unit 116 transmits each of the image data in units of the page of the document obtained by the first obtain processing unit 111 and the extraction processing unit 112 to the image forming apparatus 20. The transmission processing unit 116 transmits each of the image data in units of the page of the document obtained by the determination processing unit 113 and the second obtain processing unit 114 to the image forming apparatus 20.

For example, the transmission processing unit 116 transmits each of the image data in units of the page of the document obtained by the first obtain processing unit 111 and the extraction processing unit 112 together with distance information indicating the distance from the photographic subject obtained by the distance detecting unit 115 to the image forming apparatus 20. The transmission processing unit 116 transmits each of the image data in units of the page of the document obtained by the determination processing unit 113 and the second obtain processing unit 114 together with the distance information obtained by the distance detecting unit 115 to the image forming apparatus 20.

The ROM of the image forming apparatus 20 preliminarily stores a data outputting program to cause the CPU of the control unit 21 to execute a data outputting process (see FIG. 5) described later. The data outputting program is recorded in a computer readable recording medium, such as a CD, a DVD, and a flash memory. The data outputting program may be read from the recording medium and installed in the storage unit 26 or the EEPROM or similar medium.

The control unit 21 includes, as illustrated in FIG. 1, a reception processing unit 211, an image processing unit 212, a failure detecting unit 213, a notification processing unit 214, a size detecting unit 215, a determination processing unit 216, and an output processing unit 217. Specifically, the control unit 21 executes the data outputting program stored in the ROM using the CPU. This causes the control unit 21 to function as the reception processing unit 211, the image processing unit 212, the failure detecting unit 213, the notification processing unit 214, the size detecting unit 215, the determination processing unit 216, and the output processing unit 217.

The reception processing unit 211 receives each of the image data in units of the page of the document transmitted from the portable terminal 10. The reception processing unit 211 receives the distance information transmitted together with each of the image data in units of the page of the document from the portable terminal 10.

The image processing unit 212 executes a preliminarily determined image processing with respect to each of the image data in units of the page of the document received by the reception processing unit 211.

For example, the image processing includes a process to correct a variation of lightness of each of the image data in units of the page of the document. The image processing includes a process to correct a distortion of a shape of the rectangular shaped region (document region) included in each of the image data in units of the page of the document. The image processing includes a rotation process that corrects an inclination of the document region included in each of the image data in units of the page of the document. The image processing includes an enlargement/reduction processing that corrects a variation of an area of the document region included in each of the image data in units of the page of the document. The image processing includes a process to highlight a contour of the image in each of the image data in units of the page of the document.

The failure detecting unit 213 detects a preliminarily determined failure in each of the image data in units of the page of the document received by the reception processing unit 211.

For example, the failure includes a first failure that a part of the document region is not included in the image data in units of the page of the document. The failure includes a second failure that the image included in the image data in units of the page of the document is out of focus.

For example, the failure detecting unit 213 executes the contour detection process with respect to each of the image data in units of the page of the document received by the reception processing unit 211. Then, the failure detecting unit 213 detects the first failure when it is determined that the image data in units of the page of the document does not include the rectangular shaped region based on the execution result of the contour detection process. The failure detecting unit 213 detects the second failure when the contour of the document region is not detected from the image data in units of the page of the document even though the contour detection process is executed. The failure detecting unit 213 may detect the second failure when a character is not detected from the image data in units of the page of the document after executing a character detection process (OCR process) with respect to each of the image data in units of the page of the document received by the reception processing unit 211.

When the failure is detected in any of the image data in units of the page of the document by the failure detecting unit 213, the notification processing unit 214 causes the portable terminal 10 to notify the detection of the failure and the portable terminal 10 to display the image data in units of the page of the document in which the failure is detected.

For example, the notification processing unit 214 transmits failure detection information that indicates a type of the failure detected by the failure detecting unit 213, the image data in units of the page of the document in which the failure is detected, and a control signal that instructs the operation display 12 to display the failure detection information and the image data in units of the page of the document to the portable terminal 10.

The size detecting unit 215 detects a size of the document based on each of the image data in units of the page of the document and the distance information received by the reception processing unit 211. Specifically, the size detecting unit 215 detects the size of the document based on the area of the document region and the distance information included in the image data in units of the page of the document.

The determination processing unit 216 determines a page sequence of each of the image data in units of the page of the document based on each of the image data in units of the page of the document received by the reception processing unit 211.

For example, the determination processing unit 216 determines the page sequence of each of the image data in units of the page of the document based on page information detected from each of the image data in units of the page of the document received by the reception processing unit 211. For example, the page information is page numbers. For example, the determination processing unit 216 executes the character detection process (OCR process) with respect to each of the image data in units of the page of the document received by the reception processing unit 211. Then, the determination processing unit 216 detects the page numbers from each of the image data in units of the page of the document based on the execution result of the character detection process.

The determination processing unit 216 may determine the page sequence of each of the image data in units of the page of the document based on presence/absence of a consistency in a context on the first line and the last line included in each of the image data in units of the page of the document received by the reception processing unit 211.

The output processing unit 217 outputs each of the image data in units of the page of the document received by the reception processing unit 211 in accordance with the page sequence determined by the determination processing unit 216.

For example, the output processing unit 217 prints each of the image data in units of the page of the document received by the reception processing unit 211 in accordance with the page sequence determined by the determination processing unit 216. Here, the output processing unit 217 prints each of the image data in units of the page of the document received by the reception processing unit 211 on a sheet with a size identical to the size of the document detected by the size detecting unit 215.

The output processing unit 217 may generate document data, such as a PDF in which each of the image data in units of the page of the document received by the reception processing unit 211 is arranged in accordance with the page sequence determined by the determination processing unit 216 and store the generated document data in the storage unit 26. The output processing unit 217 may generate the document data and transmit the generated document data to an external information processing device, such as the portable terminal 10.

First Obtaining Process

Figure 3:
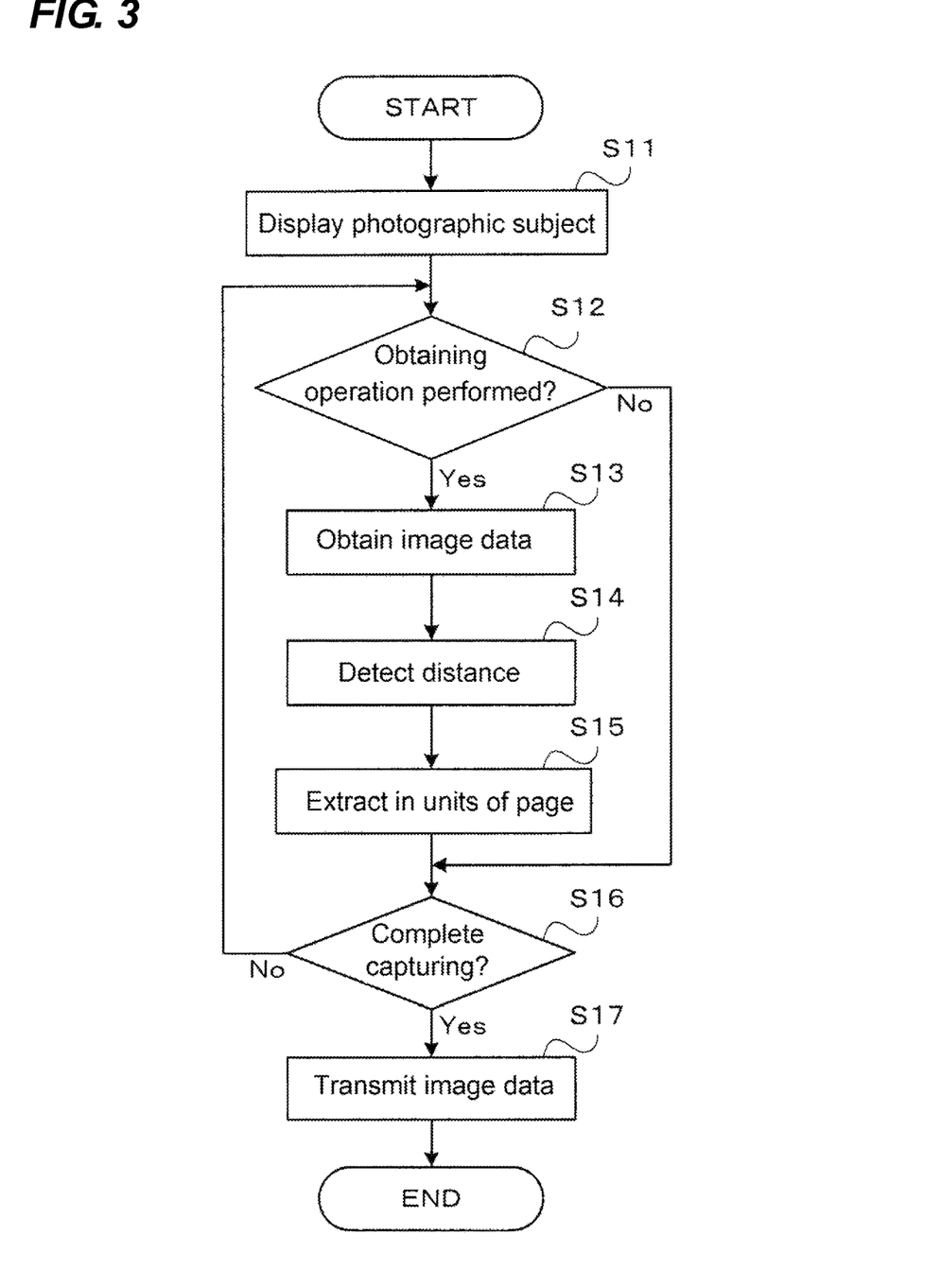
FIG. 3 illustrates an example of a first obtaining process executed by a portable terminal according to the one embodiment.

The following describes a part of procedures for an image processing method in the disclosure together with an example of procedures for a first obtaining process executed by the control unit 11 in the portable terminal 10 with reference to FIG. 3. Here, Steps S11, S12 . . . denote numbers of the process procedures (steps) executed by the control unit 11. The first obtaining process is executed when a user operation instructing an execution of the first obtaining process is performed in the operation display 12.

Step S11

First, at Step S11, the control unit 11 causes the imaging unit 14 to output the image data of the photographic subject and the operation display 12 to display the image data of the photographic subject output from the imaging unit 14.

Step S12

At Step S12, the control unit 11 determines whether the obtaining operation is performed or not.

Here, the control unit 11 makes the process transition to Step S13 when it is determined that the obtaining operation is performed (Yes side at Step S12). When the obtaining operation is not performed (No side at Step S12), the control unit 11 makes the process transition to Step S16.

Step S13

At Step S13, the control unit 11 obtains the image data (still image data) of the photographic subject displayed on the operation display 12 at a time when it is determined that the obtaining operation is performed at Step S12.

Step S14

At Step S14, the control unit 11 detects the distance from the photographic subject using the distance sensor 15 at a time when the image data of the photographic subject is obtained by Step S13. Here, the process of Step S14 is executed by the distance detecting unit 115 of the control unit 11. The process of Step S14 may be omitted.

Step S15

At Step S15, the control unit 11 extracts the image data in units of the page of the document from the image data of the photographic subject obtained by Step S13. Here, the processes of Steps S11, S12, S13, and S15 are one example of the obtaining steps in the disclosure. The processes of Steps S11, S12, and S13 are executed by the first obtain processing unit 111 of the control unit 11. The process of Step S15 is executed by the extraction processing unit 112 of the control unit 11.

For example, the control unit 11 executes the contour detection process with respect to the image data of the photographic subject obtained by Step S13. Next, the control unit 11 detects the rectangular shaped region included in the image data of the photographic subject based on the execution result of the contour detection process. Then, the control unit 11 extracts each of the detected rectangular shaped regions as the image data in units of the page of the document.

This extracts each of the image data in units of the page of the document from the image data obtained by the imaging unit 14 even when the plurality of pages of the images of the document are captured at once by the imaging unit 14. Therefore, the user's labor in the obtaining operation is reduced when the image data of each page of the document is obtained in the portable terminal 10.

The process of Step S15 may be omitted. That is, in the first obtaining process, the obtaining operation may be performed for each page of the document by the user.

Step S16

At Step S16, the control unit 11 determines whether capturing of each page of the document is completed or not.

For example, the control unit 11 determines that capturing of each page of the document is completed when a user operation that instructs to complete capturing of each page of the document is performed.

Here, the control unit 11 makes the process transition to Step S17 when it is determined that capturing of each page of the document is completed (Yes side at Step S16). The control unit 11 makes the process transition to Step S12 when capturing of each page of the document is not completed (No side at Step S16). This repeatedly executes the processes of Step S13 to S15 according to the obtaining operation until capturing of each page of the document is completed. The process of Step S14 may be omitted from a second time on.

Step S17

At Step S17, the control unit 11 transmits each of the image data in units of the page of the document extracted at Step S15 to the image forming apparatus 20. Here, the process of Step S17 is one example of transmitting steps in the disclosure and executed by the transmission processing unit 116 of the control unit 11.

For example, the control unit 11 transmits the distance information that indicates the distance from the photographic subject obtained by Step S14 together with each of the image data in units of the page of the document extracted at Step S15 to the image forming apparatus 20.

The process of Step S17 may be executed after Step S15 and before Step S16. That is, the process of Step S17 may be executed every time the image data in units of the page of the document is obtained according to the obtaining operation. In this case, the control unit 11 transmits capturing completion information indicating the completion of capturing of each page of the document to the image forming apparatus 20 when it is determined that capturing of each page of the document is completed at Step S16.

Second Obtaining Process

Figure 4:
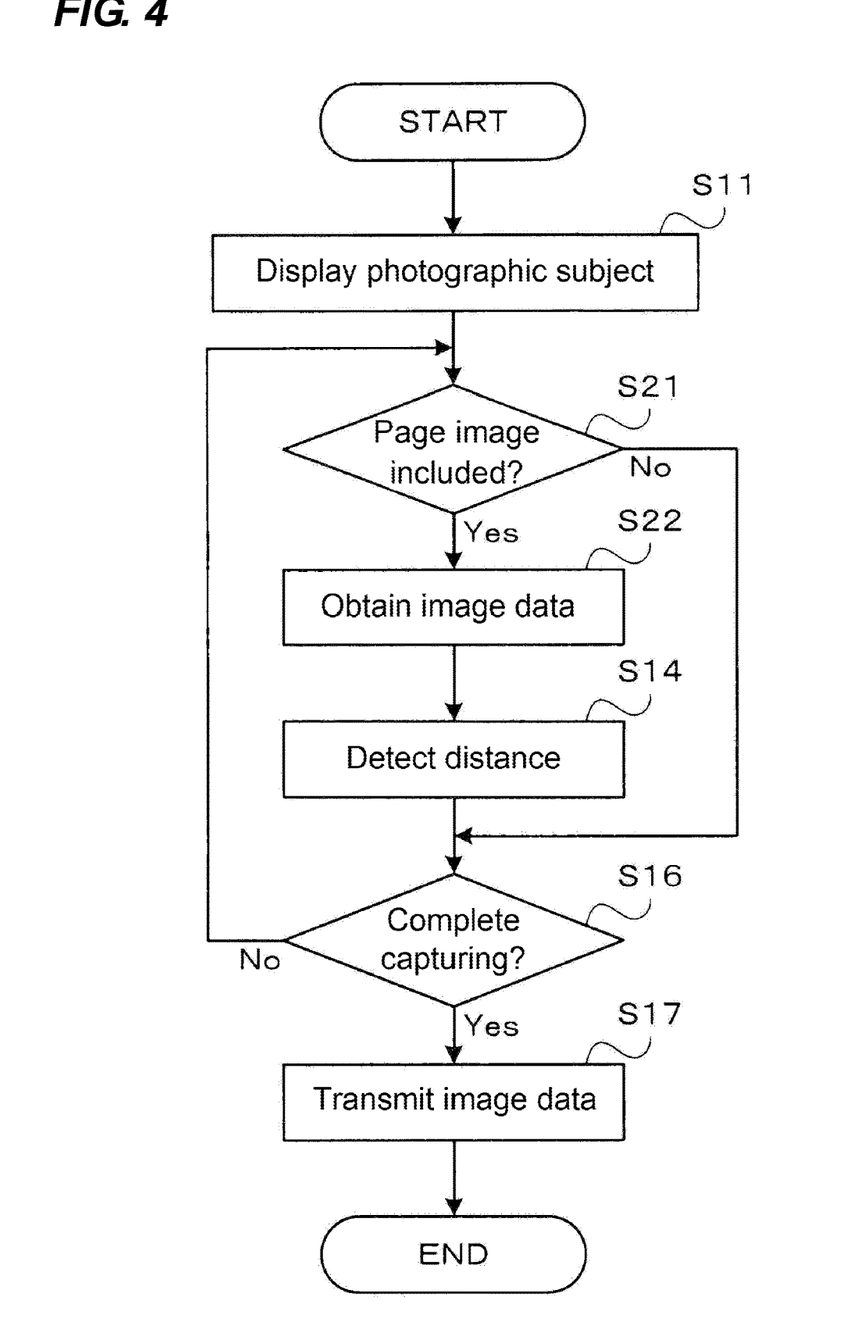
FIG. 4 illustrates an example of a second obtaining process executed by the portable terminal according to the one embodiment.

Next, a part of the procedures for the image processing method in the disclosure will be described together with an example of procedures for a second obtaining process executed by the control unit 11 in the portable terminal 10 with reference to FIG. 4. The second obtaining process is executed when a user operation instructing an execution of the second obtaining process is performed in the operation display 12.

Here, contents of the second obtaining process are approximately identical to the contents of the first obtaining process except that the processes of Steps S21 and S22 are executed instead of the processes of Steps S12 and S13 and the process of Step S15 is omitted. Therefore, the following description only describes parts that are different from the first obtaining process.

Step S21

At Step S21, the control unit 11 determines whether the image data of the photographic subject output from the imaging unit 14 includes the image in units of the page of the document or not.

For example, the control unit 11 executes the contour detection process with respect to the image data of the photographic subject output from the imaging unit 14. Then, the control unit 11 determines that the image data of the photographic subject output from the imaging unit 14 includes the image in units of the page of the document when it is determined that the image data of the photographic subject includes one rectangular shaped region based on the execution result of the contour detection process.

Here, the control unit 11 makes the process transition to Step S22 when it is determined that the image data of the photographic subject output from the imaging unit 14 includes the image in units of the page of the document (Yes side at Step S21). The control unit 11 makes the process transition to Step S16 when the image data of the photographic subject output from the imaging unit 14 does not include the image in units of the page of the document (No side at Step S21).

Step S22

At Step S22, the control unit 11 obtains the image data (still image data) of the photographic subject displayed on the operation display 12 at a time when it is determined that the image data of the photographic subject output from the imaging unit 14 includes the image in units of the page of the document at Step S21. Here, the processes of Steps S11, S21, and S22 are another example of the obtaining steps in the disclosure. The processes of Steps S11 and S21 are executed by the determination processing unit 113 of the control unit 11. The process of Step S22 is executed by the second obtain processing unit 114 of the control unit 11.

This automatically obtains the image data in units of the page of the document every time the image data of the photographic subject output from the imaging unit 14 includes the image in units of the page of the document at Step S21. Therefore, the user's labor in the obtaining operation is reduced when the image data of each page of the document is obtained in the portable terminal 10. Each of the image data in units of the page of the document obtained at Step S22 is transmitted to the image forming apparatus 20 at Step S17.

In the second obtaining process, the process of Step S15 of the first obtaining process may be executed after the process of Step S14. That is, it may be determined whether the image data of the photographic subject output from the imaging unit 14 include one or a plurality of images in units of the page of the document or not at Step S21, and the image data including the one or the plurality of images in units of the page of the document may be obtained at Step S22.

Data Outputting Process

Figure 5:
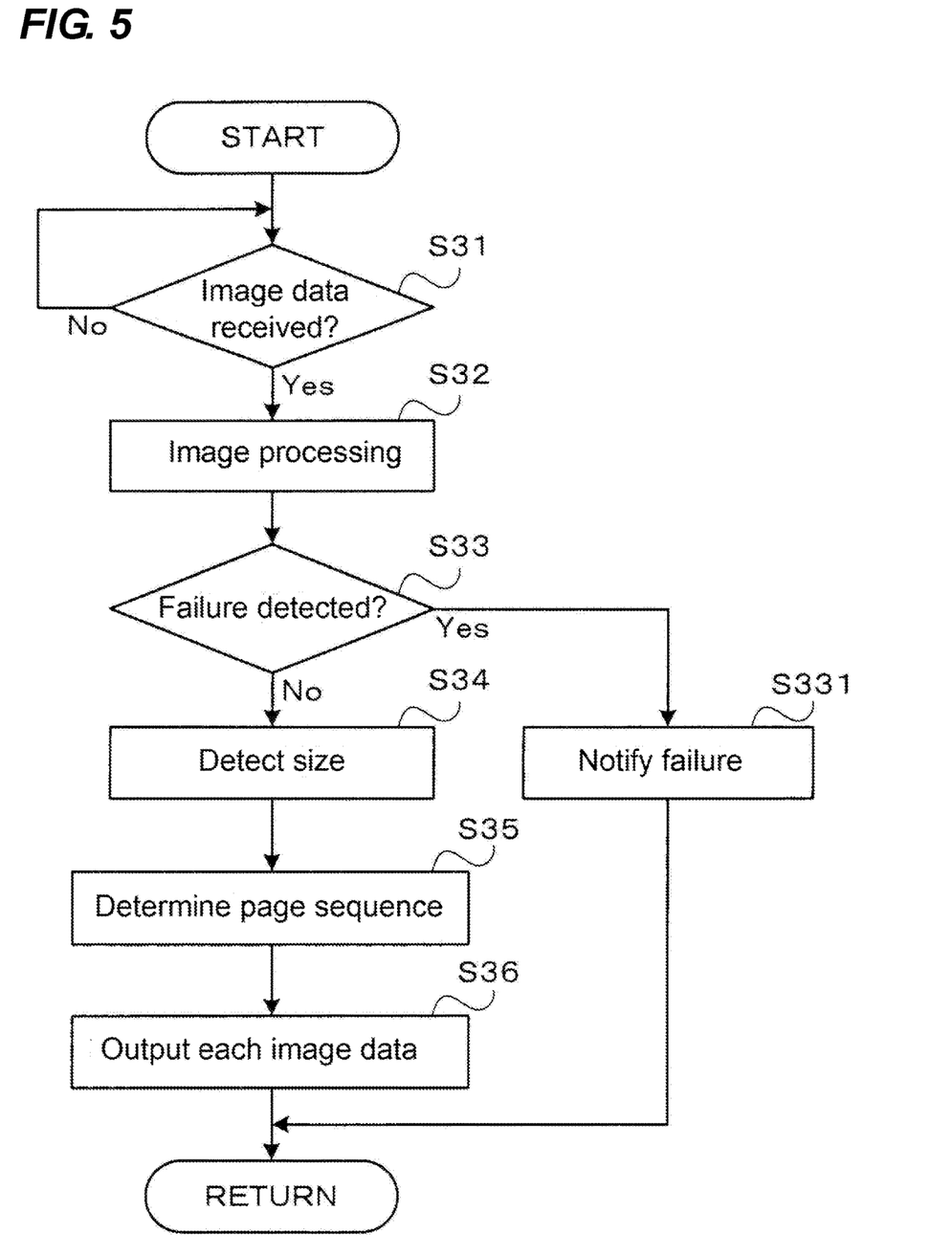
FIG. 5 illustrates an example of a data outputting process executed by the image forming apparatus according to the one embodiment.

Next, with reference to FIG. 5, the following describes a remaining part of the one example of the procedures for the image processing method in the disclosure together with an example of procedures for a data outputting process executed by the control unit 21 in the image forming apparatus 20. The data outputting process is executed when a user operation instructing an execution of the data outputting process is performed in the operation display 24.

Step S31

First, at Step S31, the control unit 21 determines whether each of the image data in units of the page of the document and the distance information are received from the portable terminal 10 or not. Here, the process of Step S31 is one example of the receiving steps in the disclosure and executed by the reception processing unit 211 of the control unit 21.

Here, the control unit 21 makes the process transition to Step S32 when it is determined that each of the image data in units of the page of the document and the distance information are received from the portable terminal 10 (Yes side at Step S31). The control unit 21 waits for receiving each of the image data in units of the page of the document and the distance information from the portable terminal 10 at Step S31 when each of the image data in units of the page of the document and the distance information are not received from the portable terminal 10 ("No" side at Step S31).

The control unit 21 waits for receiving each of the image data in units of the page of the document and the distance information from the portable terminal 10 until the capturing completion information is received at Step S31 when the obtained image data is transmitted every time the image data in units of the page of the document is obtained according to the obtaining operation in the portable terminal 10.

Step S32

At Step S32, the control unit 21 executes the image processing with respect to each of the image data in units of the page of the document that is determined to have been received at Step S31. Here, the process of Step S32 is executed by the image processing unit 212 of the control unit 21. The process of Step S32 may be omitted.

Step S33

At Step S33, the control unit 21 determines whether the failure is detected or not in any of each of the image data in units of the page of the document that is determined to have been received at Step S31. Here, the process of Step S33 is executed by the failure detecting unit 213 of the control unit 21. The process of Step S33 may be omitted.

For example, the control unit 21 executes the contour detection process with respect to each of the image data in units of the page of the document that is determined to have been received at Step S31. Then, the control unit 21 detects the first failure when it is determined that the image data in units of the page of the document does not include the rectangular shaped region based on the execution result of the contour detection process. The control unit 21 detects the second failure when the contour of the document region is not detected from the image data in units of the page of the document even though the contour detection process is executed.

Here, the control unit 21 makes the process transition to Step S331 when it is determined that the failure is detected in any of each of the image data in units of the page of the document (Yes side at Step S33). The control unit 21 makes the process transition to Step S34 when the failure is not detected in any of each of the image data in units of the page of the document (No side at Step S33).

Step S331

At Step S331, the control unit 21 causes the portable terminal 10 to notify the fact that the failure is detected and the portable terminal 10 to display the image data in units of the page of the document in which the failure is detected. Here, the process of Step S331 is executed by the notification processing unit 214 of the control unit 21.

For example, the control unit 21 transmits the failure detection information that indicates the type of the detected failure, the image data in units of the page of the document in which the failure is detected, and the control signal instructing the operation display 12 to display the failure detection information and the image data in units of the page of the document to the portable terminal 10. This allows the user to recognize the page of the document in which the failure is detected to retry capturing the image of the page of the document in which the failure is detected.

The processes of Steps S33 and S331 may be executed in the portable terminal 10. That is, the control unit 11 of the portable terminal 10 may include a configuration similar to the failure detecting unit 213 and the notification processing unit 214. For example, the processes of Steps S33 and S331 may be executed after the process of Step S15 of the first obtaining process.

Step S34

At Step S34, the control unit 21 detects the size of the document based on each of the image data in units of the page of the document and the distance information that are determined to have been received at Step S31. Here, the process of Step S34 is executed by the size detecting unit 215 of the control unit 21. The process of Step S34 may be omitted.

Specifically, the control unit 21 detects the size of the document based on the area of the document region included in the image data in units of the page of the document and the distance information.

Step S35

At Step S35, the control unit 21 determines the page sequence of each of the image data in units of the page of the document based on each of the image data in units of the page of the document that is determined to have been received at Step S31. Here, the process of Step S35 is one example of the determining steps in the disclosure and executed by the determination processing unit 216 of the control unit 21.

For example, the control unit 21 determines the page sequence of each of the image data in units of the page of the document based on the page number detected from each of the image data in units of the page of the document. For example, the control unit 21 executes the character detection process with respect to each of the image data in units of the page of the document. Then, the control unit 21 detects the page numbers from each of the image data in units of the page of the document based on the execution result of the character detection process.

Step S36

At Step S36, the control unit 21 outputs each of the image data in units of the page of the document that is determined to have been received at Step S31 in accordance with the page sequence determined by Step S35. Here, the process of Step S36 is one example of outputting steps in the disclosure and executed by the output processing unit 217 of the control unit 21.

For example, the control unit 21 prints each of the image data in units of the page of the document in accordance with the page sequence determined by Step S35. Here, the control unit 21 prints each of the image data in units of the page of the document on the sheet with the size identical to the size of the document detected by Step S34. This reduces the user's labor in setting the size of the sheet on which each of the image data in units of the page of the document is printed.

The control unit 21 may generate the document data, such as the PDF in which each of the image data in units of the page of the document that is determined to have been received at Step S31 is arranged in accordance with the page sequence determined by Step S35 and store the generated document data in the storage unit 26. The control unit 21 may generate the document data and transmit the generated document data to the external information processing device, such as the portable terminal 10.

Thus, in the image processing system 100, the page sequence of each of the image data in units of the page of the document obtained by the portable terminal 10 is determined. This ensures outputting each of the image data in units of the page of the document in accordance with the page sequence even when each of the image data in units of the page of the document is transmitted from the portable terminal 10 not in accordance with the page sequence in the image processing system 100.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing system comprising:
   a portable terminal; and
   an image processing apparatus; wherein
   the portable terminal includes
      an imaging unit for imaging, as a photographic subject, a document having a plurality of pages,
      a data obtaining unit that obtains, using the imaging unit, image data of each page of the document,
      a transmission processing unit that transmits each of the image data in page units of the document obtained by the data obtaining unit, and
      a distance detecting unit that detects a distance from the photographic subject when the data obtaining unit obtains the image data of each page of the document;
   the image processing apparatus includes
      a reception processing unit that receives each of the image data in page units of the document transmitted from the portable terminal,
      a determination processing unit that determines a page sequence of each of the image data in page units of the document, based on each of the image data in page units of the document received by the reception processing unit, and
      an output processing unit that outputs each of the image data in page units of the document received by the reception processing unit in accordance with the page sequence determined by the determination processing unit;
   the transmission processing unit transmits to the reception processing unit distance information that indicates the distance from the photographic subject detected by the distance detecting unit, together with each of the image data in page units of the document obtained by the data obtaining unit;
   the image processing apparatus further includes a size detecting unit that detects a size of the document based on each of the image data in page units of the document and on the distance information received by the reception processing unit; and
   the output processing unit prints each of the image data in page units of the document on a sheet with a size identical to the size of the document detected by the size detecting unit, in accordance with the page sequence.

2. The image processing system according to claim 1, wherein the determination processing unit determines the page sequence of each of the image data in page units of the document based on page information detected from each of the image data in page units of the document received by the reception processing unit.

3. The image processing system according to claim 1, wherein the data obtaining unit includes:
   a first obtain processing unit that obtains image data of a photographic subject using the imaging unit every time a preliminarily determined obtaining operation is performed; and
   an extraction processing unit that extracts the image data in page units of the document from the image data of the photographic subject obtained by the first obtain processing unit.

4. The image processing system according to claim 1, wherein the data obtaining unit includes:
- a determination processing unit that determines whether the photographic subject includes an image in page units of the document or not; and
- a second obtain processing unit that obtains the image data of the photographic subject using the imaging unit every time the determination processing unit determines the photographic subject includes the image in page units of the document.

5. The image processing system according to claim 1, wherein the image processing apparatus further includes:
- a failure detecting unit that detects a preliminarily determined failure in each of the image data in page units of the document received by the reception processing unit; and
- a notification processing unit that causes the portable terminal to notify a fact that the failure is detected and to display the image data in page units of the document in which the failure is detected when the failure detecting unit detects the failure in any of the image data in page units of the document.

6. An image processing method executed in an image processing system including a portable terminal with an imaging unit, and an image processing apparatus, the image processing method comprising:
- with the portable-terminal imaging unit, imaging, as a photographic subject, a document having a plurality of pages;
- obtaining, using the imaging unit, image data of each page of the document;
- transmitting from the portable terminal each of the image data in page units of the document obtained by the obtaining;
- with the portable terminal, detecting a distance from the photographic subject when the obtaining obtains the image data of each page of the document;
- receiving in the image processing apparatus each of the image data in page units of the document transmitted from the portable terminal;
- in the image processing apparatus, determining a page sequence of each of the image data in page units of the document based on each of the image data in page units of the document received by the receiving;
- in the image processing apparatus, outputting each of the image data in page units of the document received by the receiving in accordance with the page sequence determined by the determining;
- with the portable terminal, transmitting to the image processing apparatus distance information that indicates the distance from the photographic subject detected by the detecting, together with each of the image data in page units of the document obtained by the obtaining;
- in the image processing apparatus, detecting a size of the document based on each of the image data in page units of the document and on the received distance information; and
- in the image processing apparatus, printing each of the image data in page units of the document on a sheet with a size identical to the size of the document detected by the size detecting, in accordance with the page sequence.

* * * * *